United States Patent [19]

Yamada

[11] 3,779,709

[45] Dec. 18, 1973

[54] DEVICE FOR REMOVING NOXIOUS SUBSTANCES DISCHARGED FROM CHIMNEYS

[76] Inventor: Kiichi Yamada, No. 15-12, 1-Chome, Jingumae, Shibuya-ku, Tokyo, Japan

[22] Filed: Feb. 22, 1972

[21] Appl. No.: 228,005

Related U.S. Application Data

[63] Continuation-in-part of Ser. No. 46,299, June 15, 1970, abandoned.

[30] Foreign Application Priority Data

Jan. 31, 1970 Japan.................................. 45/8123

[52] U.S. Cl....................... 23/260, 23/284, 55/228, 55/233, 55/242, 55/263, 55/524, 110/119, 261/17, 261/98
[51] Int. Cl............................................ B01d 47/06
[58] Field of Search .................. 55/90, 93, 94, 220, 55/222, 226, 228, 233, 242, 259, 263, 418, 419, 524; 261/17, 96–98, 117; 110/119; 23/284, 260

[56] References Cited
UNITED STATES PATENTS 2,056,429  10/1936  Learmonth ......................... 261/112
2,080,713  5/1937   Hayes ................................ 261/110
2,350,591  6/1944   Coey .................................. 261/118

FOREIGN PATENTS OR APPLICATIONS 28,565  12/1924  France .............................. 55/220

*Primary Examiner*—Bernard Nozick
*Attorney*—Robert E. Burns et al.

[57] ABSTRACT

A device for removing noxious substances discharged from chimneys and the like, which includes a pair of filter units disposed in each of two flues defined in the chimney, so as to be selectively put into service by a flip over vane. Each flue has two filter sections: a first section where a viscous liquid cleanser for dust and other particles of the discharge is intermittently sprayed unto a porous filler disposed therein when the flue is in use, while a washing liquid is sprayed onto the filler for washing said particles away from the filler together with the liquid cleanser when the flue is not in use; and a second section where a neutralizer is sprayed to the porous filler disposed therein for neutralizing acidic or basic components of the discharge when the flue is in use. Staggered V-shaped troughs are provided below each section to catch liquid draining from the respective fillers for recirculation while permitting flow of flue gas up the chimney.

6 Claims, 9 Drawing Figures

DEVICE FOR REMOVING NOXIOUS SUBSTANCES DISCHARGED FROM CHIMNEYS

This application is a continuation-in-part of application Ser. No. 46,299 filed June 15, 1970, now abandoned.

This invention relates to a device for removing noxious substances discharged from chimneys and the like.

An object of the present invention is to provide a device for assuredly removing noxious substances contained in combustion gases and smoke discharged from chimneys of fireboxes of steam engines and boilers.

For a better understanding of the invention, reference is made to the accompanying drawings, in which.

Like parts are designated by like numerals throughout the drawings.

Figure 1:
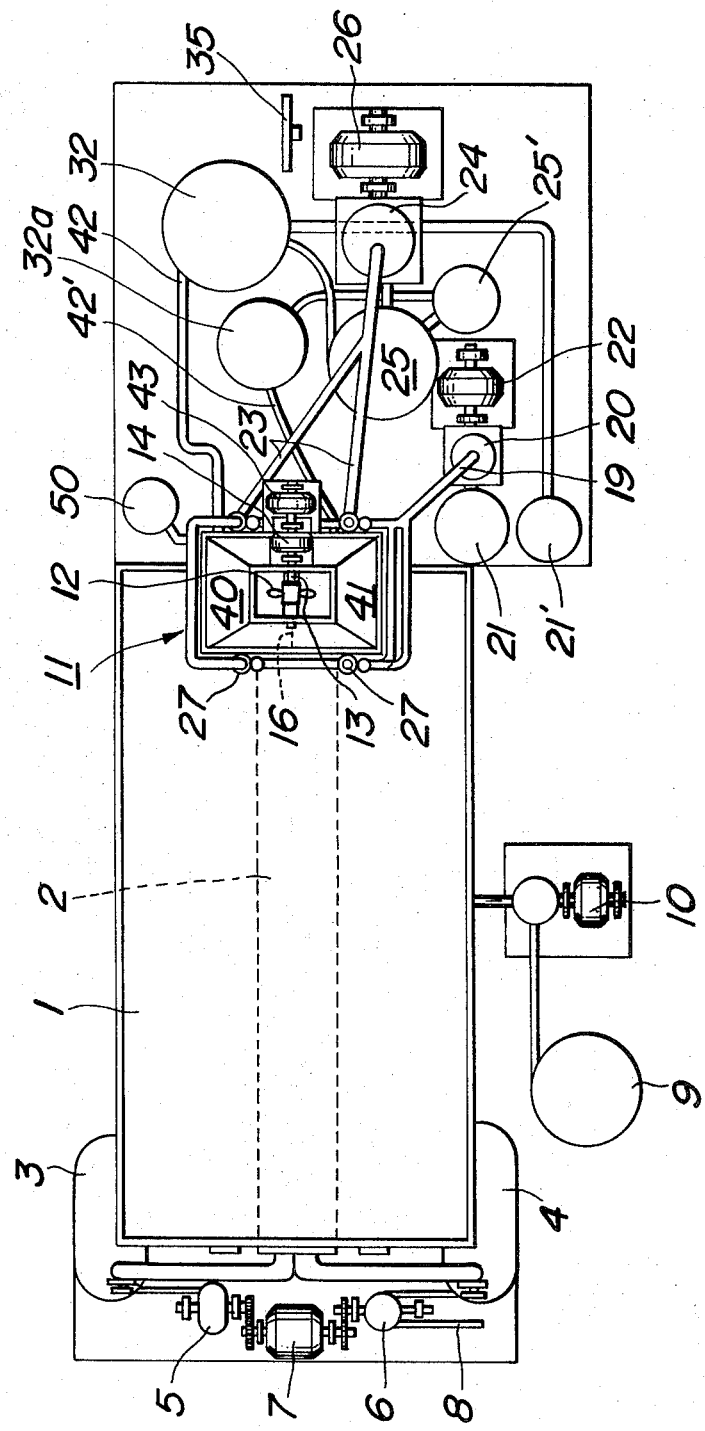
FIG. 1 is a plan view of an embodiment of the present inention.

In the figures, the reference numeral 1 represents a commonly used boiler having a firebox 2, a compressed air tank 3, and a compressed fuel tank 4. An electric motor 7 is used for driving an air compressor 5 and a fuel compressor 6, and the fuel compressor compresses fuel from a fuel feed pipe 8 so as to deliver it to the firebox 2. Another electric motor 10 drives a suitable pump for feeding clean water from a filtered water tank 9 to the boiler 1.

Figure 2:
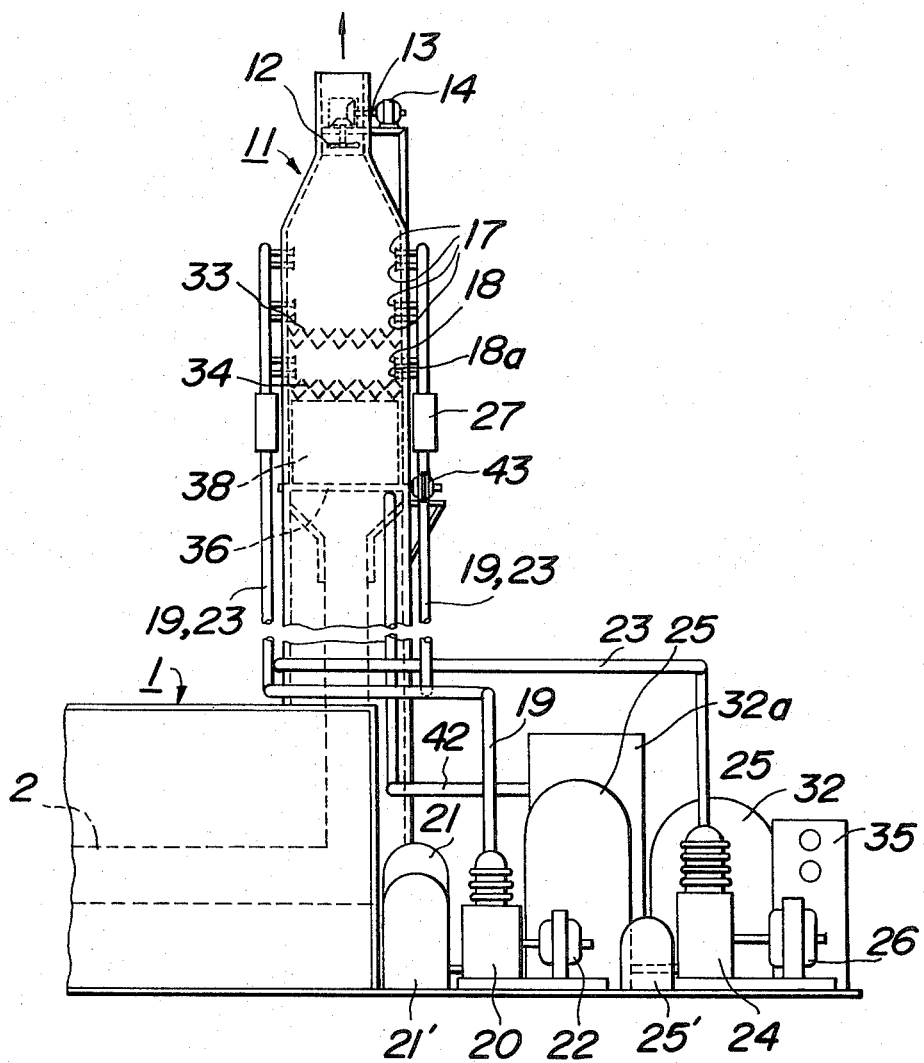
FIG. 2 is a partial elevation of the device.
Figure 3:
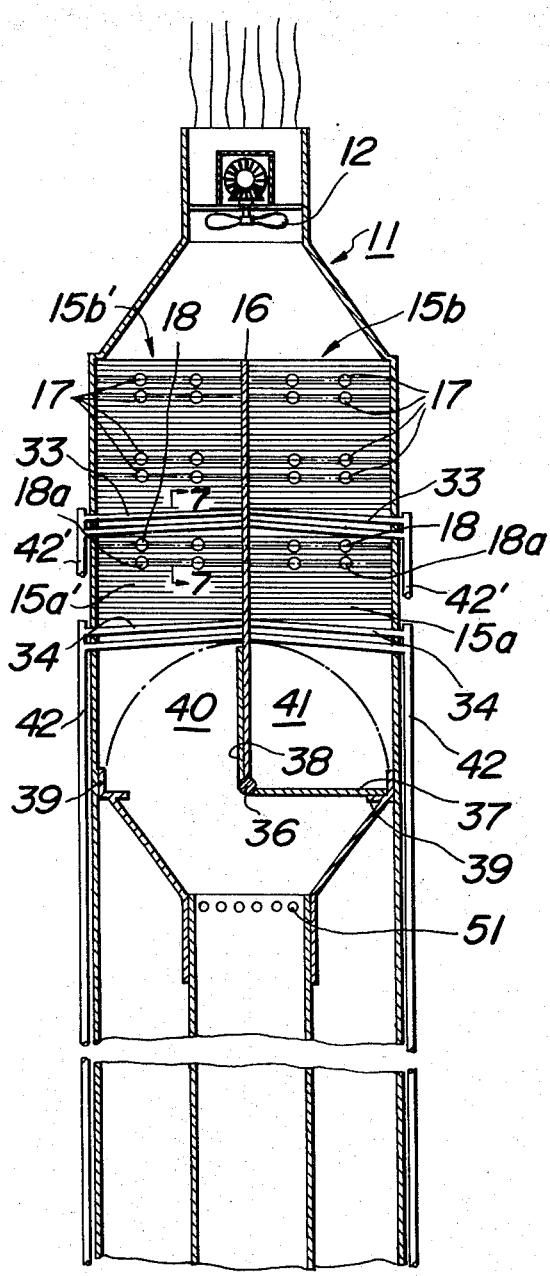
FIG. 3 is an enlarged fragmentary sectional view of a special device for removing noxious substances from exhaust gases.
Figure 4:
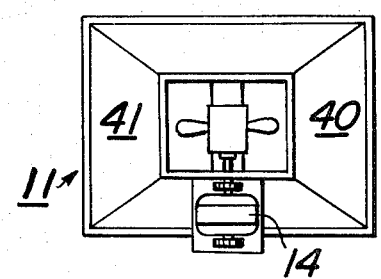
FIG. 4 is a plan view of a driving mechanism of an exhaust fan.

A chimney 11 is disposed at the rear end of the firebox 2, or at the right-hand end of the firebox, as seen in FIG. 1. Toward the upper end of the chimney 11, a rotary shaft 13 is mounted, so as to rotatably hold an exhaust fan 12, as shown in FIGS. 2, 3, and 4. A driving motor 4 is suitably supported at the upper end of the chimney 11, for driving the shaft 13, for controllably accelerating the exhaust of the gas through the chimney 11.

A pair of noxious substance remover or filter units 15a, 15b, or 15a', 15b', according to the present invention, are mounted within the chimney 11 in each of the two sections or flues 40, 41, defined by a partition wall 16 and the inner peripheral surface of the chimney. Each remover unit 15a, 15b, 15a', or 15b' comprises a plurality of "sponge-like" filter meshes connected with each other. Each of the filter meshes is made by binding stainless steel wires or other corrosion resistant wires into brush-like form, or weaving such wires into a mesh with a high porosity.

Each lower or first remover or filter unit 15a or 15a' includes a plurality of first nozzles 18 for injecting liquid cleanser delivered from a liquid cleanser tank 50 through a pump 20a, a plurality of second nozzles 18a for injecting washing liquid delivered from a washing liquid tank 21, and a plurality of troughs 34 for receiving the entire liquids injected from the first and second nozzles. The liquid cleanser from the first nozzles 18 is mostly held by the filter mesh members for arresting dust particles and smoke particles in the exhaust gas passing through the chimney 11. Each upper or second remover or filter unit 15b or 15b' includes a plurality of third nozzles 17 for injecting neutralizing liquid delivered from a neutralizing liquid tank 25, and a plurality of troughs 33 for receiving the entire liquid injected from the third nozzles 17.

Figure 7:
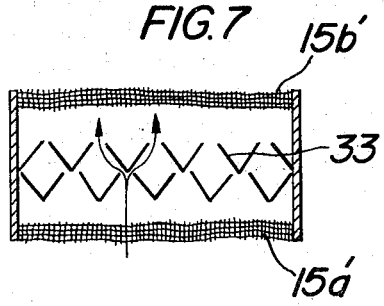
FIG. 7 is a partial sectional view of a trough.

Referring to FIG. 7, the troughs 33 and 34 are disposed so as to allow the substantially free passage of the exhaust gas, which gas is pulled upwards by the exhaust fan 12. Preferably, a plurality of water nozzles 51 are provided at the lower portion of the chimney 11 along the passage of the exhaust gas, as shown in FIG. 3. A suitable amount of cooling water is injected from the water nozzles 51 into the exhaust gas, in such a manner that the entire cooling water is evaporated in the exhaust gas, before reaching to the bottom of the chimney, so as to reduce the temperature of the exhaust gas to a predetermined level for maximizing the cleansing effect at the first and second remover units. Such water nozzles 51, however, are not essential in the present invention. The washing liquid in the tank 21 is delivered to the second nozzles 18a through a compressor 20 and washing liquid pipes 19. A motor 22 is provided for driving the compressor 20. The neutralizing liquid is delivered to the third nozzles 17 from the tank 25 by another compressor 24 through neutralizing liquid pipes 23.

The pump 24 for feeding the washing liquid is driven by another motor 26.

Figure 5:
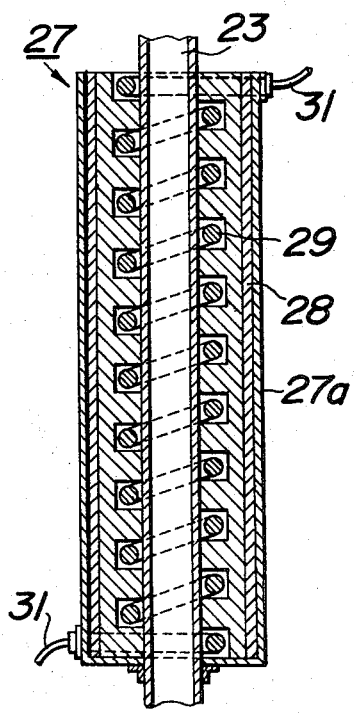
FIG. 5 is an enlarged longitudinal sectional view of a heater mounted on a pipe for feeding a washing chemical.
Figure 6:
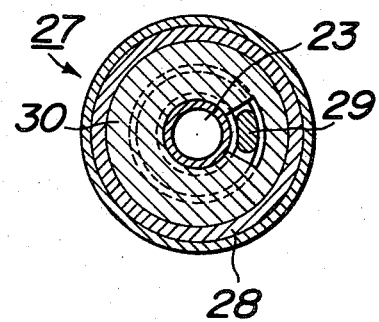
FIG. 6 is an enlarged lateral sectional view of the heater of the pipe.

Suitable electric heaters 27 are mounted on the washing chemical pipes 23 at selected locations, so as to heat the chemical flowing therethrough. Referring to FIGS. 5 and 6, each electric heater 12 mountable on the washing chemical pipes 23 is housed in a suitable casing 27a secured to a selected position of the pipe 23 by any known means, e.g., by welding. The casing 27a is lined with a heat insulating material layer 28, and a heating element 29, such as a nichrome wire coil, is wound about the pipe 23 and secured thereto by filling firebricks 30 between the heat insulating lining 28 and the heating element 29. A pair of terminals are secured to the casing 27a and connected to the opposing ends of the heating element 29, so as to facilitate the power supply to the heating element through lead wires 31, as shown in FIG. 5.

The device of the invention may be remotely controlled by providing a remote-control unit 35.

Referring to FIGS. 2 and 3, a pair of rotary valves 37, 38 are secured to a shaft 36 extending through the chimney 11 at an intermediate portion thereof, which valves are automatically actuated by means of a motor 43. Suitable valve seats 39 are integrally secured to the inner wall of the chimney 11, so as to selectively close a portion of the chimney 11 by cooperating with the rotary valves 37, 38.

The liquid cleanser to be injected through the first nozzles 18 is for absorbing, adsorbing, and neutralizing noxious substances, such as smoke, sulfurous acid gas, hydrocarbons, oxides of nitrogen, carbon monoxide, stray dust particles, etc. For such purposes, the liquid cleanser should preferably be somewhat sticky. Examples of such cleanser include viscous oils, sticky solutions of starch and the like, ammonia water, lime, a special chemical mixture of suitable cleansing agents, etc.

The washing liquid in the tank 21 is to quickly wash the aforesaid cleanser, after the latter has collected noxious substances by adsorption, absorption, or neutralization. The washing chemical should also have a power to wash away bare noxious substances, e.g., smoke particles. Examples of such washing chemical include steam, hot water, a soap solution, a solution of caustic soda, a special mixture of other suitable washing chemicals, etc.

In operation, for separating noxious substances from smoke or combustion gases being exhausted through the chimney 11, one of the two flues 40, 41 of the chimney 11 is activated, while inactivating the other one of them, by means of the rotary valves 37, 38. In the embodiment, as illustrated in FIG. 3, the rotary valve 38 is turned to its vertical position adjacent the partition wall 16, while the other rotary valve 37 is kept in contact with the valve seat 39. Thus, the flue 40 is open, but the other flue 41 is blocked by the rotary valve 37. The remover unit 15a for arresting noxious substances, disposed in the flue 40, is charged with the aforesaid liquid cleanser prior to the cleansing operation. The charging is effected by injecting the cleanser through the first nozzles 18 secured to the chimney walls. The liquid cleanser thus injected is suspended in the sponge-like mesh members of the remover unit 15a. Accordingly, as the smoke or combustion gas ascends through the chimney 11, while being sucked by the exhaust fan 12, the noxious substances contained in the smoke or the combustion gas are collected by the cleanser by adsorption, absorption, or neutralization.

When the cleanser in the flue 40 is saturated after a certain period of cleansing operation, such saturation is detected by any known method, so that the rotary valves 37 and 38 are automatically actuated by an automatic controller (not shown), for closing the flue 40 by the valve 38 while opening the other flue 41 by deblocking the valve 37. When the flue 41 is used for cleansing the smoke or the combustion gas, the remover unit 15a in the flue 40 is washed by injecting the aforesaid washing chemical from the second nozzles 18b. Thus, with the device of the invention, when one of the two remover units for arresting noxious substances is acting on the smoke or the combustion gas for collecting such substances, the other remover unit is always washed. Such operation of the two remover units is alternatingly switched over, in an automatic manner.

The washing chemical which is delivered from the tank 21 through the pipe 19 by the compressor 20 driven by the motor 22, is preferably heated by the electric heaters 27, prior to the injection through the second nozzles 18b. Thus, hot washing chemical is injected toward the remover units 15a, 15a', so that the cleanser saturated with the noxious substances can be washed away from the remover units almost instantaneously. After passing through the first removing units 15a, or 15a', the exhaust gas comes in contact with the neutralizing liquid injected through the third nozzles 17. For instance, if the exhaust gas contains an acidic compound, e.g., sulfurous acid, the neutralizing liquid may be provided with a basic compound, e.g., caustic soda. In this particular case, the neutralizing reaction between the sulfurous acid and the caustic soda may produce sodium hydrogen sulfite, which can be recovered in the following filtering process for using it in industrial applications.

The washing liquid and the neutralizing liquid, delivered to the troughs 34 and 33 after the cleansing operation in the remover units, are transferred to the filters 32 and 32a through the return pipes 42 and 42', respectively, for filtering the noxious substances from the liquids. Then, the liquids are returned to the washing liquid tank 21 and the neutralizing liquid tank 25, for completing the circulation thereof. If the washing power or neutralizing power is deteriorated, or the amount of the cleanser or washing chemical is reduced, after repeated circulations, the fresh cleansing liquid and fresh neutralizing liquid may be supplemented from the reserve tank 21' or 25', respectively.

Figure 8A:
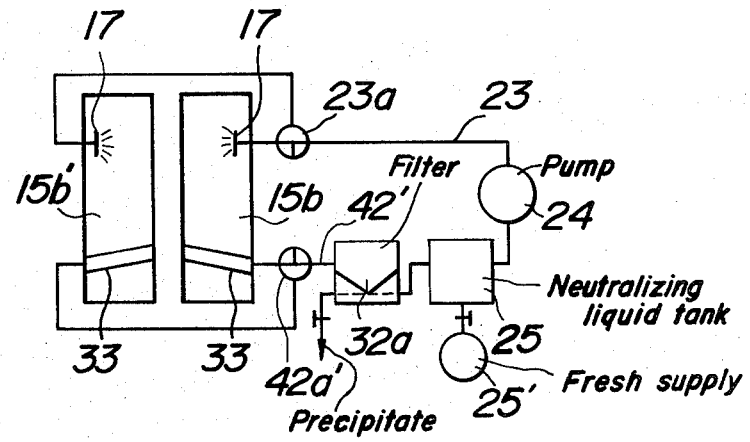
FIGS. 8A and 8B are schematic circuit diagrams illustrating recirculating routes of neutralizing liquid and washing liquid, respectively.
Figure 8B:
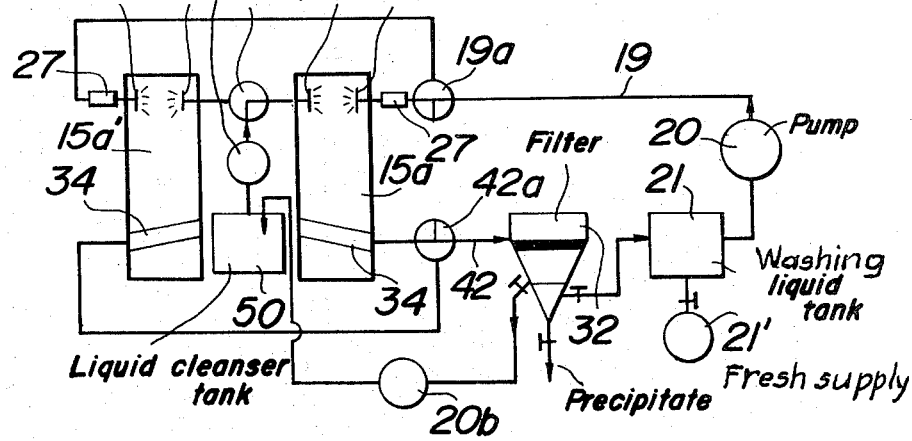

FIGS. 8A and 8B illustrate two routes for the dual circulations of liquids for cleansing exhaust gas, respectively. In the embodiment of FIG. 8B, olive oil is used as a liquid cleanser for arresting dust and iron oxide particles. Upon washing with hot water, the dust and other particles are washed away together with the olive oil, so as to be collected in a funnel-like filter tank 32. In the filter tank 32, heaviest particles, e.g., iron oxide particles are collected at its bottom, and the olive oil whose specific gravity is about 0.91 is accumulated on the top of water, while causing very light dust particle to float on the top surface of the olive oil. By mounting three different valves to the filter tank 32 at different levels, the heavy particles, water, and the olive oil can be separated, as shown in FIG. 8B. The light dust particles can easily be removed by sweeping with a suitable tool.

After such separation, the olive oil may be forced back to the liquid cleanser tank 50 by a feedback pump 20b for purposes of the aforesaid recirculation.

Referring to FIG. 8A, if the exhaust gas contains acidic sulfer dioxide gas ($SO_2$), a basic neutralizing liquid, e.g., sodium hydroxide, may be used as a neutralizing liquid. In this case, the following two chemical reactions may take place simultaneously.

$NaOH + SO_2 \rightarrow NaHSO_3$

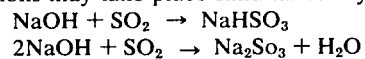

Both sodium sulfite ($Na_2SO_3$) and sodium hydrogen sulfite ($NaHSO_3$) are comparatively insoluble in water, so that such sulfites can easily be separated by filtering. Furthermore, the two sulfites are industrially useful, and they can be sold on commercial basis to partly recover the cost of cleansing the exhaust gas.

As described in the foregoing disclosure, with the device of the invention, the removal of noxious substances from exhaust gases and smokes can be ensured, so as to prevent the air pollution. The two flues, accompanied by the two remover units, can be automatically actuated alternatingly by using the rotary valves, so that each remover unit can be washed to refresh the cleanser thereof without interrupting the operation of the device for the removal of noxious substances. Thereby, the overall efficiency of the device is greatly improved. Furthermore, the provision of the pair of remover units and the flues makes it possible to repair any faulty portions of the device, without interrupting the operation of the device. As seen in FIGS. 8A and 8B three way valves 19a, 23a, 42a, 42a' and 50a permit feeding the cleansing, washing and neutralizing liquids selectively to one flue or the other depending on which flue is in use. As seen in FIG. 7, the inclined, staggered V-shaped troughs 33 permit the collection of neutralizing liquid draining from the filter mass 15b, 15b' without materially impeding the upward flow of the flue gas. Likewise, the inclined trougs 34 which are of like arrangement collect the liquid cleanser and washing liquid draining from the filter mass 15a, 15a'. The filter masses are of a construction to provide a high surface contact area without objectionally impeding the flow of the flue gas. For example, they can be formed of a highly porous mass of woven, knitted or matted wires or filaments of stainless steel, glass or other corrosion and heat resistant material.

While a preferred embodiment of the invention has been illustrated in the drawings and is herein particularly described, it will be understood that the invention is in no way limited to this embodiment.

What is claimed is:

1. A device for removing noxious substances from exhaust gas being discharged through a chimney, comprising a chimney for exhausting a gas carrying noxious substances, partition means defining a pair of parallel flues formed at an intermediate portion of the chimney, each of said flues having an upper filter unit and a lower filter unit disposed therein, each of said filter units comprising filter means providing a large surface area for contact by said exhaust gas, rotary valve means mounted in the chimney below said lower filter units so as to selectively open one of the flues for passing the gas therethrough while closing the other flue in an alternating fashion, a plurality of first nozzles mounted in each of said lower filter units for injecting a liquid cleanser onto said filter means of said lower filter units, said liquid cleanser collecting noxious substances in the gas, a plurality of second nozzles mounted in each of said lower filter units for injecting washing liquid onto said filter means of said lower filter units, said washing liquid washing off the liquid cleanser after said collection, a plurality of third nozzles mounted in each of said upper filter units for injecting a neutralizing liquid on said filter means of said upper filter units for neutralizing non-neutral compounds in the exhaust gas passing through said upper filter units, troughs disposed at the lower end of each of said lower and upper filter units, said troughs allowing passage of the gas therethrough but receiving all liquid coming down from the respective filter unit, a first circulating means for recirculating said washing liquid from said troughs located below said lower filter units to said second nozzles, said first circulating means including means for separating noxious substances from the washing liquid from said troughs so as to deliver clean washing liquid to said second nozzles, a second circulating means for recirculating said neutralizing liquid from said troughs located below said upper filter units to said third nozzles, said second circulating means including means for removing neutralized substance from said neutralizing liquid before delivering said neutralizing liquid to said third nozzles, and an exhaust fan means located at the top end of the chimney for drawing the exhaust gas through the chimney.

2. A device according to claim 1, wherein said exhaust gas contains sulfurous acid and said neutralizing liquid contains caustic soda, so that sodium hydrogen sulfite is produced by neutralization, and wherein said removing means in said second circulating means comprises means for separating said sodium hydrogen sulfite from said liquid received by said troughs below said upper filter units.

3. A device according to claim 1, wherein said chimney further comprises a plurality of water nozzles located in the chimney below said valve means, so as to inject water to the exhaust gas at such a rate that the injected water completely evaporates in the exhaust gas so as to reduce the temperature of the exhaust gas to a level suitable for treatments at said filter units.

4. A device according to claim 1, wherein said filter means of the filter units comprises a plurality of sponge-like filter mesh members made by knitting fine flattened corrosion-resistant linear elements, said mesh members being grouped in two blocks in each of said flues said blocks comprising respectively said upper and lower filter units.

5. A device according to claim 4, wherein said linear members are stainless steel wires which are bound together in brush form.

6. A device according to claim 4, wherein said linear members are stainless steel wires which are woven into the form of mesh with a high porosity.

* * * * *